Aug. 6, 1929.  R. H. WALLACE  1,723,986
CONDUIT
Filed March 30, 1928
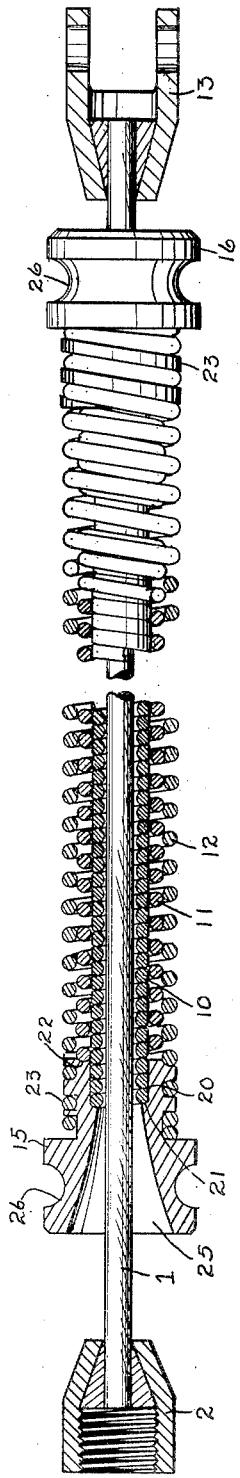
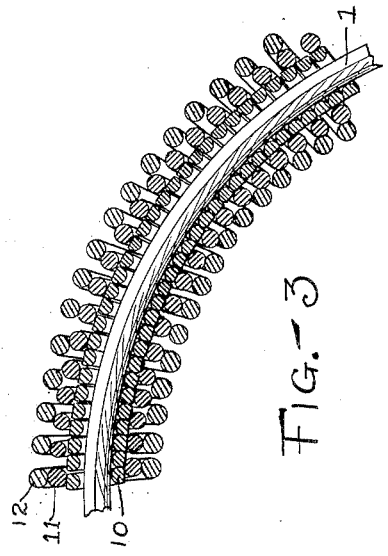
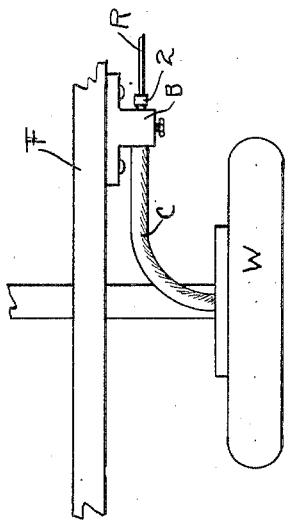

Patented Aug. 6, 1929.

1,723,986

UNITED STATES PATENT OFFICE

ROBERT H. WALLACE, OF DETROIT, MICHIGAN, ASSIGNOR TO THE MIDLAND STEEL PRODUCTS COMPANY, OF CLEVELAND, OHIO, A CORPORATION OF OHIO.

CONDUIT.

Application filed March 30, 1928. Serial No. 265,998.

This invention relates to flexible conduits particularly adapted for use as a flexible force transmitting device in combination with a cable or other flexible inextensible member.

I am aware of the Bowden type of flexible conduit and my invention constitutes an improvement thereon.

It is among the objects of my invention to provide a flexible force transmitting device suitable for use as a connecting element between vehicle brake linkage and a swiveling wheel. Another object of my invention is to construct a flexible conduit of a plurality of coil springs which will support each other and lend strength to the conduit. A further object is to connect the end members with the body of the conduit in a manner which will give a secure connection, but which will facilitate rapid assembly. Another object is to provide a conduit of great strength consistent with ample supporting points of contact between the conduit and the cable particularly in curvature.

Other objects will appear from the following description of the structural details of my invention of which a preferred form is illustrated in the accompanying drawings. The essential characteristics are summarized in the claims.

In the drawing, Fig. 1 is an illustrative plan view of the employment of my conduit in a vehicle; Fig. 2 is a partially broken longitudinal section of the conduit; and Fig. 3 illustrates the relative position of the parts in curvature.

In Fig. 1, the conduit C, covered with a suitable dust cover is shown secured at one end to the vehicle frame F by a bracket B. The conduit extends to brake mechanism associated with the swiveling wheel W. The end of the conduit adjacent the wheel may be secured to a relatively fixed part of the brake mechanism in a manner not specifically shown. Referring also to Figs. 2 and 3, the cable 1 extends through the conduit and is freely movable longitudinally thereof. End members 2 and 3 are secured to the ends of the cable. The end member 2 may be joined to a brake rod R, as shown in Fig. 1, and the end member 3 may engage brake operating mechanism, not shown.

The conduit proper comprises an inner coil spring 10 adjacent the cable, an intermediate spring 11 and an outer spring 12. End members 15 and 16 engage the three springs. The inner spring 12 is closely wound and the strands of the spring are maintained in contact with each other in all positions assumed by the conduit. The outer surface of the strands of the spring 10 may be flattened slightly so that the spring 11 may be more free to move longitudinaly of the spring 10 when the conduit is curved. The ends of the inner spring lie in cylindrical sockets or seats 20 of the end members, which have annular shoulders 21 engaging the ends of the spring.

The intermediate spring 11 abuts the end members as at 22 and closely overlies the inner spring 10. The strands of the spring 11 are spaced apart when the spring is formed so that the strands of this spring do not contact with each other in normal curvature, as illustrated in Fig. 3. The spring 11 serves the double function of spacing the springs 10 and 12 from each other and lending lateral support to the spring 10 when compressive strain is put upon the conduit.

The outer spring 12 is extended in tension and secured to the end members, as at 23, in screw threads so that the spring 12 draws the end members toward each other and maintain the spring 10 in a compressed state.

The end members, as mentioned above, provide seats for the inner spring and are secured to the outer spring. Each of the end members have longitudinal passageways for the cable, as shown, and are provided with flared openings 25 to permit lateral movement of the cable therein. Each of the end members have annular grooves 26 by means of which the end members may be secured at relatively fixed points such as within the bracket B on the chassis frame.

It will appear from the foregoing description of my invention that a conduit made in accordance to my teaching has the advantage of strength and durability combined with ease of assembly and inexpensiveness of materials. While I have illustrated and described a preferred form thereof, changes within its scope may occur to one skilled in the art, I do not care to be limited in the scope thereof other than by the claims appended hereto.

I claim:

1. In a conduit the combination of a central closely coiled spring, a pair of end members having central cylindrical sockets with shoulders for receiving said spring and resilient means joining said end members and drawing them toward each other and maintaining the central spring in compression.

2. A conduit comprising end members with external screw threads, a normally extended coil spring secured in said screw threads and tending to draw said end members together, and a central normally compressed spring disposed within said first named spring and seated at its ends in said members and spacing them apart.

3. A flexible conduit having end members with centrally located seat portions facing each other, a compressed coil spring seated at its ends in said end members having its strands abutting each other, a second coil spring laterally engaging said first coil spring and having its strands spaced apart, and a third coil spring extended in tension with its strands spaced apart and laterally engaging the second coil spring and secured at its ends to said end members and drawing them toward each other upon said first named coil spring.

4. The combination of a cable and a flexible conduit therefor, comprising a plurality of coaxially disposed coil springs, the inner spring having its strands compressed and laterally engaging the cable at least in curvature and the outer spring being normally distended in tension and arranged to compress said inner spring, and end members engaged by said springs whereby the outer spring exerts a compressive action on the inner spring.

5. A flexible force transmitting device, comprising a longitudinally inextensible cable part and a longitudinally incompressible conduit part in which the cable is housed, said conduit part comprising three concentric units, each formed of helically wound strands in close lateral association with each other, and separately formed end members for the conduit part to which at least part of said strands are secured, said separately formed end members taking the compressive load from the several strands when force is transmitted through the device.

6. A flexible force transmitting device, comprising a longitudinally inextensible cable part having yokes secured at its ends for transmitting tension to the cable part, and a longitudinally incompressible conduit part comprising end members for transmitting compressive force to said conduit part, said conduit part comprising three members formed of helically wound strands all engaging said end members, the innermost of said strands laterally supporting the cable part and at least one of said members having its strands bearing upon each other and adapted to transmit compressive loads from one of said end members to the other.

7. A flexible force transmitting device, comprising a longitudinally inextensible cable part and a longitudinally incompressible conduit part for housing the cable and supporting it laterally, said conduit part comprising a plurality of units each formed of helically wound strands, the innermost of which contacts with the cable, the strands of one of said units being disposed at a greater pitch than the strands of the units which surrounds it, the strands of the surrounding unit closely engaging the surrounded unit and constraining the strands of the surrounded unit.

In testimony whereof, I hereunto affix my signature.

ROBERT H. WALLACE.